United States Patent [19]
Chynoweth et al.

[11] 3,914,678
[45] Oct. 21, 1975

[54] CONTROL SYSTEM FOR COMPENSATING FOR CUTTING MACHINE TOOL WEAR

[75] Inventors: Lawrence L. Chynoweth, Utica; Kurt O. Tech, Grosse Pointe Shores, both of Mich.

[73] Assignee: The Cross Company, Fraser, Mich.

[22] Filed: May 16, 1973

[21] Appl. No.: 360,669

[52] U.S. Cl. .............. 318/568; 318/561; 318/600; 235/151.11
[51] Int. Cl.² ........................................ G05B 19/42
[58] Field of Search ........... 318/561, 568, 578, 600; 235/151.11

[56] References Cited
UNITED STATES PATENTS

| | | | |
|---|---|---|---|
| 2,996,348 | 8/1961 | Rosenberg | 318/568 X |
| 3,164,909 | 1/1965 | Rosenberg | 318/568 X |
| 3,181,403 | 5/1965 | Sterns et al. | 318/600 |
| 3,555,252 | 1/1971 | Garden | 318/561 X |
| 3,622,767 | 11/1971 | Koepcke | 318/561 X |
| 3,629,560 | 12/1971 | Slawson | 318/561 UX |
| 3,699,720 | 10/1972 | Lenning | 318/561 UX |
| 3,727,119 | 4/1973 | Stanley et al. | 318/568 |

*Primary Examiner*—T. E. Lynch
*Attorney, Agent, or Firm*—Harness, Dickey & Pierce

[57] ABSTRACT

A control system for adjusting the cutter of a boring machine or the like to compensate for cutter wear and other cutting dimensional changes such as those due to temperature variations which is specially adapted for use with a gage for measuring a dimension of a part machined by the tool and which is responsive to a signal from the gage indicating the magnitude and the sense of the variation of the dimension of the machined part relative to a nominal dimension for adjusting the tool the entire amount needed to compensate for the variation in a single adjusting operation.

6 Claims, 6 Drawing Figures

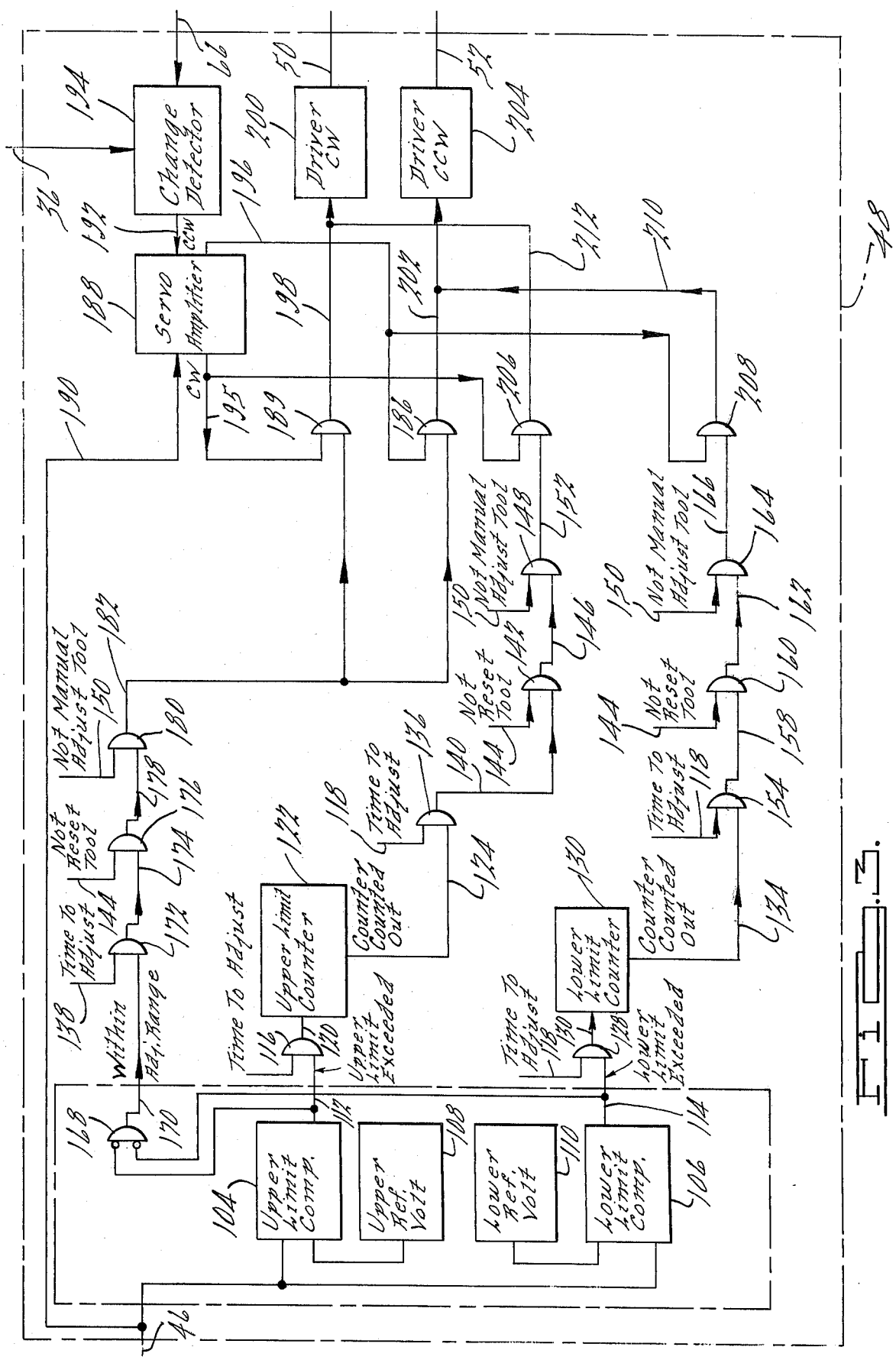

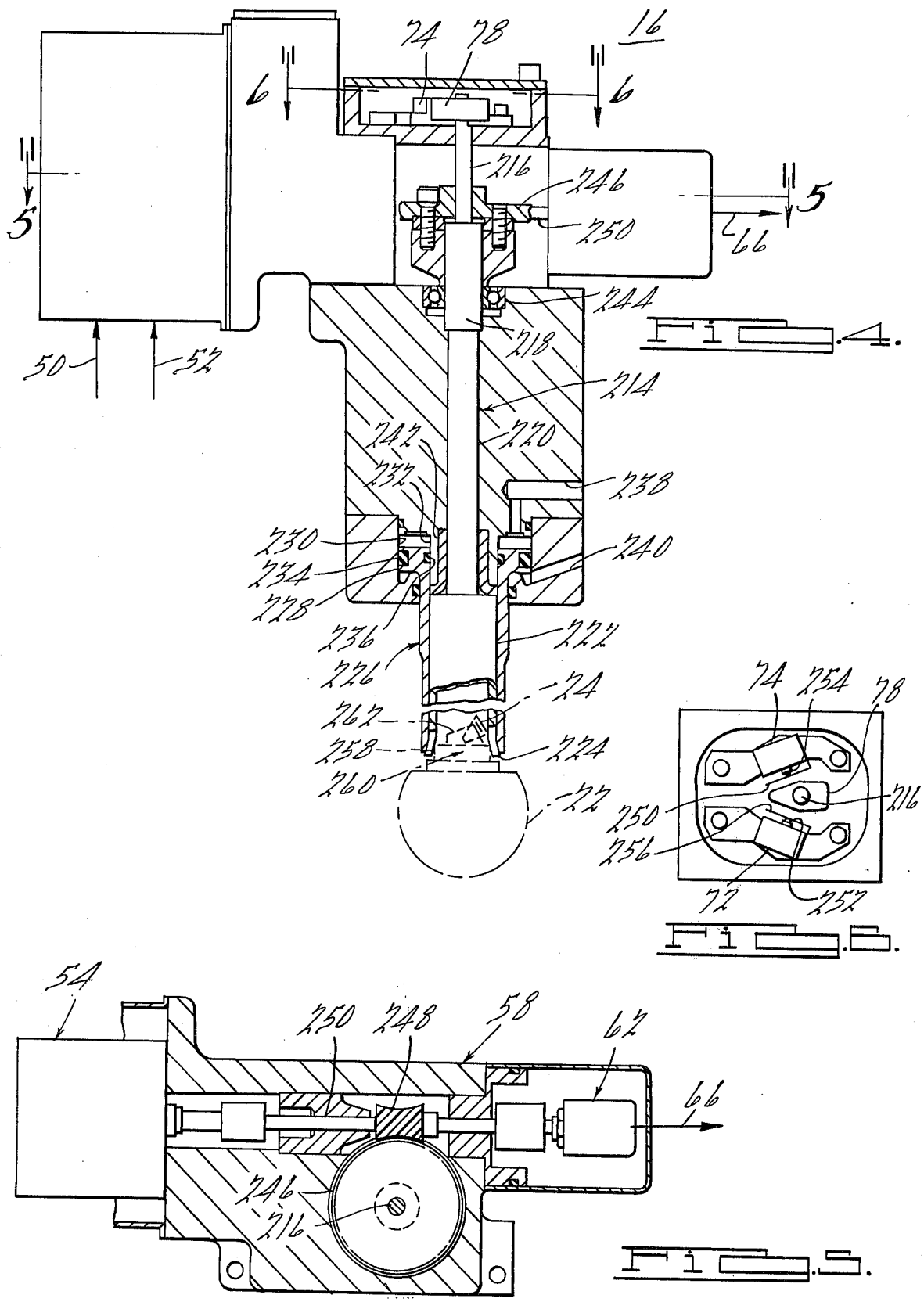

CONTROL SYSTEM FOR COMPENSATING FOR CUTTING MACHINE TOOL WEAR

BACKGROUND AND SUMMARY OF THE INVENTION

The present invention relates to control systems for compensating for machine tool wear which respond to the measurement of a part which has been machined by a boring machine or the like and which adjusts the cutter or tool of the boring machine so that a subsequently machined part is expected to have a desired dimension.

The present invention provides an improved controlled system for compensating for machine tool wear which advantageously adjusts the cutter or tool of the machine the entire amount which appears necessary to bring a subsequently machined part to a desired dimension in a single tool adjusting step and which advantageously is capable of adjusting the cutter in either of two directions for compensating for temperature variations and the like. Preferably, the control system of the present invention is used in combination with a gaging unit which measures a machined part and provides an analogue error signal representative of the magnitude and the direction of the deviation of the machined part dimension from a standard or nominal dimension.

The preferred exemplary control system of this invention includes a memory for memorizing the analogue error signal from the gaging unit, an upper limit comparator to determine when a predetermined upper limit relative to the nominal dimension is exceeded, and a lower limit comparator to determine when a predetermined lower limit relative to the nominal dimension is exceeded. If neither the upper limit nor the lower limit is exceeded, the tool is adjusted an amount equal to the deviation and in opposite direction to expectantly bring a subsequently machined part to the nominal dimension. If either the upper or the lower limit is exceeded, the number of parts in succession which exceed that upper or lower limit are counted, but the tool is not immediately adjusted. Once a predetermined number of successive machined parts have been found to exceed one of the upper or lower limits, three for example, the tool is adjusted an amount to expectantly bring a subsequently machined part to the nominal dimension. The tool is not adjusted after a single determination that a machined part exceeds the upper or lower limit since changes in dimension due to tool wear are likely to be small since tool wear is normally gradual, and consequently, if a large change in dimension of a machined part is experienced, it is presumed that the change is probably due to an isolated change in material hardness. Once a predetermined number of parts, in this case three, have been found to exceed an upper or lower limit, it is presumed that rapid tool wear has occurred, and therefore, an appropriate adjustment to the tool is required.

The cutter or tool adjusting mechanism which is used in combination with the control system of this invention preferably has an accesible cylindrical surface on a member which is rotatable for adjustment of the tool toward and away from the tool support member, i.e. the boring bar of a boring machine. This cylindrical surface, in response to the output of the control system, may be gripped by a collet chuck or the like which is rotatably driven by a servo motor. A feedback signal is provided by a tachometer which is coupled to the servo motor for indicating the actual amount that the tool was adjusted. The tool adjusting mechanism is capable of adjusting the position of the tool to a variable degree so that the tool may be adjusted in one adjustment operation to the exact position required to expectantly bring a subsequently machined part to the nominal dimensions. Moreover, the combination of a collet chuck and a tool adjusting member having a grippable cylindrical surface simplifies tool set up and alignment of the adjusting mechanism portion driven by the servo motor with the adjusting mechanism portion on the tool support member since the cylindrical surface can be engaged at any rotational alignment of the collet chuck.

Other advantages and features of the present invention will be apparent in view of the Detailed Description of the Preferred Embodiment presented hereinafter.

BRIEF DESCRIPTION OF THE DRAWINGS

FIG. 3 is a schematic illustration of the automatic tool adjusting logic shown in FIG. 2;

FIG. 4 is a view, shown partly in cross section, of the preferred exemplary tool adjusting mechanism of the tool wear compensating system shown in FIGS. 1–3;

FIG. 5 is another view of the tool adjusting mechanism of FIG. 4 taken generally along the lines of 5—5 of FIG. 4; and FIG. 6 is a view of tool adjustment limit device of the tool adjusting mechanism of FIG. 4 taken generally along the lines 6—6 of FIG. 4.

DETAILED DESCRIPTION OF THE PREFERRED EMBODIMENT

Figure 1:
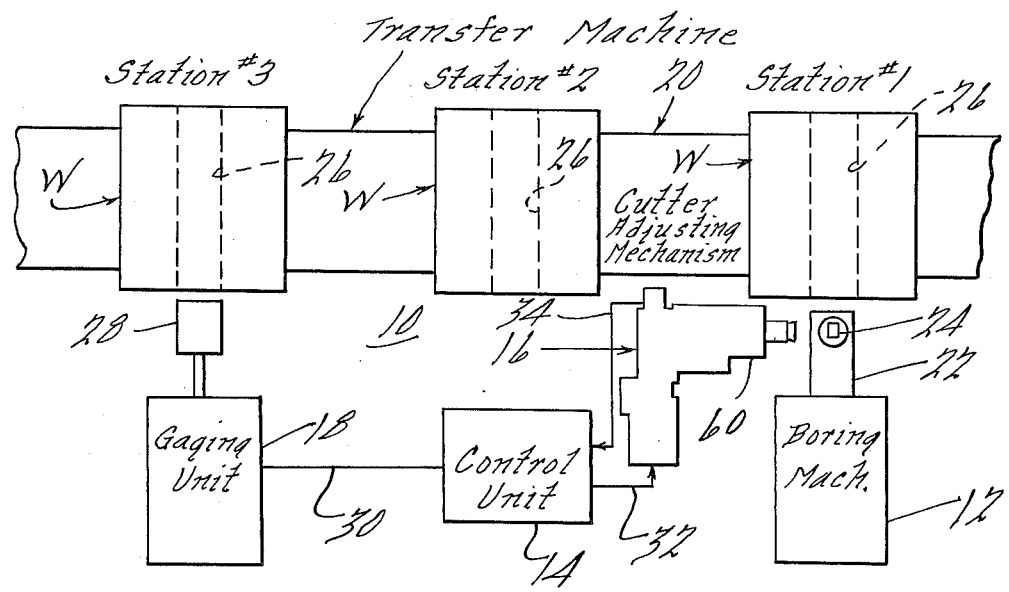
FIG. 1 is a schematic representation of a preferred exemplary tool wear compensating system of the present invention shown in combination with a gage unit, a boring machine, and a transfer machine, each of which cooperate with a plurality of workpieces shown on the transfer machine.

In FIG. 1, a tool wear compensating system 10 for a boring machine 12 is illustrated which includes a control unit 14 which is operatively connected to a cutter adjusting mechanism 16 and a gaging unit 18. The tool wear compensating system 10 and the boring machine 12 are associated with a transfer machine 20 for moving workpieces W between a plurality of stations with three of such stations being illustrated in FIG. 1. The boring machine 12 has a boring bar 22 which carries an adjustable cutter or tool 24 and which is rotatable with its associated cutter 24 for boring a cylindrical bore 26 in the workpieces W. After boring, the workpieces are transferred to an intermediate station, indicated as station 2, where the workpiece is stationary during the next boring operation. Prior to the next subsequent boring operation, the workpiece W is transferred to station 3 at which location the gage unit 18 measures the diameter of the bore 26 by insertion of a gage head 28 into the bore 26. For example, the gaging unit 18 and the gage head 28 may be of the air gage variety which measures the difference between the actual dimension of the bore 26 and a nominal dimension by measuring the flow of air or back pressure resulting from such flow of air from the gage head 28 into the bore 26. The gaging unit 18 preferably provides an analogue signal on line 30 which has a magnitude which is representative of the deviation of the bore 26 of the workpiece W from a nominal dimension and which is also representative of the direction of the deviation of the dimension of the bore 26 of the workpiece W from the nominal dimension. For example, a gage output voltage of three volts may indicate that the bore 26 of the workpiece W is at the nominal dimension and a deviation greater or less than three volts will be representative of a bore 26 which is greater or less than the nominal dimension respectively, with the amount by which the output deviates indicative of the amount that the bore dimension differs from the nominal dimension. The control unit 14 provides a control signal on line 32 which commands an adjustment of the cutter 24 by the cutter adjusting mechanism 16 and receives a feedback signal on line 34 which indicates the actual adjustment made by the cutter adjusting mechanism 16.

Figure 2:
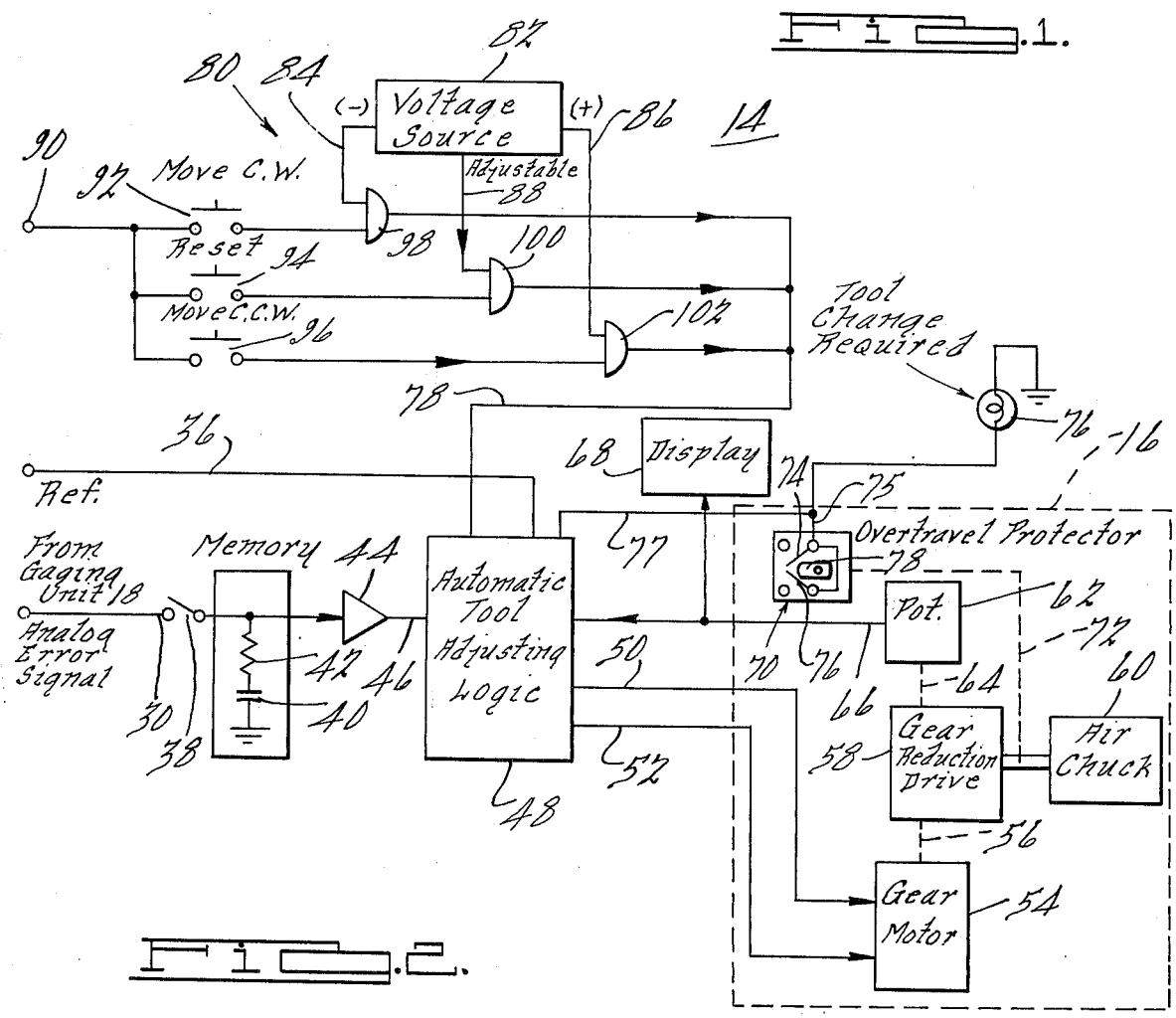
FIG. 2 is a block diagram of a preferred exemplary embodiment of a tool wear compensating system according to the present invention.

In FIG. 2, a more detailed representation of the control unit 14 and the cutter adjusting mechanism 16 is illustrated with the cutter adjusting mechanism being enclosed by dash lines. The control unit 14 is seen to receive the error signal on line 30 from the gaging unit 18 and a reference signal on line 36 from the gaging unit 18. Upon closure of a switch 38, the analogue error signal on line 30 is connected to a capacitor 40 so as to charge the capacitor 40 through a resistor 42 to a voltage level representative of the error in the dimension of the bore as measured by the gaging unit 18. The switch 38 is controlled in accordance with the sensed position of the gaging head 28 within the bore 26 so that the dimension of the bore is read at the appropriate time. The charge on the capacitor 40 is connected to the input of a high input impedance amplifier 44 through the resistor 42 to provide a signal on line 46 which is representative of the error signal stored on the capacitor 40. An automatic tool adjusting logic 48 receives the error signal on line 46 and the reference signal on line 36. The automatic tool adjusting logic 48 is responsive to the difference between the error signal on line 46 and the reference signal on line 36 to provide appropriate commands on lines 50 and 52, which comprise control cable 32, to increase or decrease the radial extension of the cutter 24, respectively. The commands on lines 50 and 52 are received by a gear motor 54 which may, for example, be driven clockwise when the bore is undersized so as to increase the radial extension of the cutter 24 in response to a signal on line 50 and may be driven counter-clockwise when the bore is oversized to decrease the radial extension of the cutter 24 in response to a signal on line 52. The gear motor 54 has an output shaft 56 which is rotatably coupled to a gear reduction drive 58 which is in turn rotatably coupled to an air chuck 60. The amount of rotational movement of the gear motor shaft 56, and consequently, of the air chuck 60, is measured by a rotary potentiometer 62 which is coupled to the gear motor 54 by a shaft 64. The rotary potentiometer 62 provides an output signal on line 66 which is received by the automatic tool adjusting logic for comparison with the command signal on line 50 or line 52 so that the total amount of tool adjustment can be closely and accurately controlled. A display unit 68 receives the signal on line 66 representative of the actual adjustment of the cutter and provides a visual indication of the actual cutter position. The cutter adjusting mechanism 16 is also provided with an over-travel protector 70 which is coupled to the air chuck 60 by a shaft 72 and which includes limit switches 74 and 76 which are operable by a cam 78 which is rotatably mounted on the shaft for indicating when the tool is at the limits of its adjustable range. Such indication is provided on a line 75 to an appropriate indicator such as a light bulb 76. The overtravel protector output signal is also provided to the automatic tool adjusting logic 48 via line 77 for purposes to be described. The automatic tool adjusting logic 48 also receives a manual adjust signal on line 78 from a manual adjust logic 80 which includes a voltage source 82 for providing a negative voltage on line 84, a positive voltage on line 86, and an adjustable voltage on a third line 88 for reasons which will be apparent hereinafter. The manual adjust logic 80 also receives an enabling signal from terminal 90 which is only provided when the boring bar and cutter are in their appropriate location for cutter adjustment. The enabling signal on terminal 90 is connected to each of a move-clockwise push button 92, a reset push button 94, and a move-counter-clockwise push button 96 which in turn connect the signal at terminal 90 to analogue AND gates 98, 100, and 102 respectively. The analogue AND gates 98–102 receive the signals on lines 84, 88 and 86, respectively, and transmit those signals to the line 78 which is connected to the automatic tool adjusting logic 48 in a manner to be described when its associated push button is closed and an enabling signal appears on terminal 90. Accordingly, the negative voltage from the voltage source 82 appears on line 78 when an enabling signal appears at terminal 90 and the move-clockwise push button 92 is closed; a positive signal on line 86 appears on line 78 when an enabling signal is provided at terminal 90 and the move-counter-clockwise push button 96 is closed; and a preset adjustable potential on line 88 appears on line 78 when an enabling signal is provided at the terminal 90 and the reset push button 94 is closed. The automatic tool adjusting logic 48 responds to the negative voltages and positive voltages on lines 84, 86 and 88 as if they were error signals so as to appropriately move the collet chuck 60 in a clockwise or counter-clockwise direction. The reset button is used to move the cutter to a predetermined position which can be set by adjustment of the adjustable potential on line 88 which preferably is the starting position after a new cutter has been mounted.

In view of the foregoing, it will be appreciated that provision is made for automatic adjustment of the cutter 24 by the cutter adjusting mechanism 60 as well as manual adjustment by the push buttons 92, 94 and 96. Moreover, these adjustments are only made when the cutter is in the appropriate position for adjustment by the interlocks provided by the switch 38 and the enabling voltage on terminal 90.

In FIG. 3, a block diagram is seen of the automatic tool adjusting logic 48. The signal on line 46 representative of the deviation of the bore dimension from the nominal dimension is provided to an upper limit comparator 104 and a lower limit comparator 106. The upper limit comparator also receives an upper reference voltage, for example, 3.5 volts, from an upper reference voltage generator 108 and a lower reference voltage, for example, 2.5 volts, from a lower reference voltage generator 110. The upper limit comparator provides an output signal on line 112 whenever the signal on line 46 exceeds the upper reference voltage indicating that an abnormally large bore has been measured, while the lower limit comparator provides a signal on line 114 indicating that an abnormally small bore has been measured. If a signal is provided on 112 indicating that the upper limit has been exceeded, and it is provided to an AND gate 116 at the same time that a signal is provided on line 118 indicating that the cutter 24 is in position for an adjustment, i.e. the boring machine bar is in the retracted position and the cutter adjusting element is aligned with the cutter adjusting chuck 60, a signal on line 120 will be provided to an upper limit counter 122 which will in turn count to one in its counting register. If three sequential signals are provided to the counter 122 indicating that the upper limit has been exceeded on three successive bore measurements, the counter 122 will provide an output signal on line 124 indicative of that fact. Similarly, if an output signal exists on line 114 when a time to adjust signal appears on line 118, an AND gate 128 will provide a signal to a lower limit counter 130 which will be counted in the register of the counter. Once the lower limit counter 132 has counted three successive signals from the AND gate 128 on line 130, the lower limit counter 132 will provide an output signal on line 134 indicative of that fact. The output of the upper limit counter 122 on line 124 is received by an AND gate 136 which additionally receives a time-to-adjust signal on line 118. The AND gate 136 provides an output signal on line 140 when both the signals on lines 124 and 118 exist which is provided to one input of an AND gate 142. The AND gate 142 also receives a signal on line 144 which is derived from the signal on line 77 and particularly, is inverted relative to the signal on line 77 so that its presence indicates that the tool adjustment is not at either limit as indicated by open limit switches 72 and 74. When there is a coincidence of the signals on lines 140 and 144, the AND gate 142 provides an output signal on line 146 which is received by yet another AND gate 148. The AND gate 148 receives a signal on line 150 when no manual adjustment is being made through the manual adjustment section 80, and provides an output signal on its output line 152 when there is coincidence of the signals on line 146 and line 150.

The lower limit counter 132 provides its output signal to an AND gate 154 which receives a time-to-adjust signal on line 118 as previously described so that the AND gate 154 provides an output signal on an output line 158 when there is coincidence of an output from the lower limit counter 132 and the time-to-adjust signal on line 118. The signal on line 158 is provided to an AND gate 160 which also receives a not-reset signal on line 144 so as to provide an output signal on line 162 when both a signal on line 144 and line 158 exists. The signal on line 162 is provided to an AND gate 164 which also receives a signal on line 150 indicative of no manual adjustment by the manual adjustment section 80 and provides an output signal on line 166 when there is coincidence of the signals on line 162 and line 150.

In view of the foregoing, the signals on lines 152 and 166 indicate that: 1) three successive bores have been measured which are either larger than the upper limit reference or smaller than the lower limit reference, respectively; 2) that the tool is in the appropriate position for adjustment; 3) that the tool is within its adjustment limits; and 4) that the manual adjustment section 80 is not in operation. As will be better appreciated hereinafter, the signals on lines 152 and 166 are enabling signals which permit the adjustment of the cutter an appropriate amount to correct for the variation between the measured bore diameter on the last measured bore 26 and the nominal dimension.

The signals on lines 112 and 114 representative of the upper limit being exceeded and the lower limit being exceeded, respectively, are provided to a NAND gate 168 which provides a signal on line 170 when neither the upper nor the lower limit is exceeded by the signal on line 46 which is representative of the deviation of the last measured bore. The signal on line 170 is received by an AND gate 172 which also receives a time-to-adjust signal on line 118 as previously described so as to provide a signal on line 174 when signals on lines 170 and 118 are coincident. The output signal on line 174 is received by an AND gate 176 which also receives a signal on line 144 indicating that the tool adjustment limits have not been exceeded so as to provide an output signal on line 178 when signals on lines 174 and 144 are coincident. The signal on line 178 is received by an AND gate 180 which also receives a signal on line 150 indicating that the tool is not being manually adjusted by the manual adjusting unit 80 and which provides an output signal on line 182 when signals on lines 178 and 150 are coincident. As will be appreciated in view of the description hereinafter, the signal on line 182 is an enabling signal which allows adjustment of the cutter 24 after each measurement of a bore 26 when the bore measurement is within the upper and lower limits as established by the reference voltages from sources 108 and 110.

Presuming now that the last measured workpiece had a bore within the appropriate limits as established by the upper and lower reference voltages, the enabling signal on line 182 will be provided to each of a clockwise driver AND gate 184 and a counter-clockwise driver AND gate 186. The signal on line 46 representative of the workpiece bore deviation will be provided to a servo amplifier 188 by a line 190. The servo amplifier 188 also receives a signal on line 192 from a change detector 194 which will initially be at the 3-volt level, i.e. the signal level representing the desired workpiece dimension. The servo amplifier compares the signals on lines 190 and 192 and provides an output signal on line 195 when the signal on line 190 indicates that the last measured bore was undersized and an output signal on line 196 when the signal on line 190 indicates that the last measured bore was oversized. Presuming now that the last measured bore 26 is undersized, the coincidence of a signal on line 195 and the signal on line 182 at the AND gate 184 will result in an output signal on line 198 which is provided to a clockwise driver 200 which in turn provides an output signal on line 50 for driving the gear motor 54 clockwise to increase the extension of the cutter from the boring bar so as to expectantly increase the bore dimension of the next part to be machined an amount to bring it to the desired dimension. In other words, the cutter 24 is adjusted in proportion to the error in a single step. If the part were oversized, and consequently, the servo amplifier 188 provided an output signal on line 196, the AND gate 186 would simultaneously receive signals on lines 182 and 196 so as to provide an output signal on line 202 which is received by the counter-clockwise driver 204 and which in turn provides a signal on line 52 to the gear motor 54 causing the gear motor to drive counter-clockwise to decrease the extension of the cutter 24 from the boring bar 22 and thereby provide a lesser bore dimension on the next part to be machined.

As the cutter 24 is adjusted, either through clockwise or counter-clockwise rotation of the gear motor 54, the potentiometer 62 provides a feedback signal on line 66 which is received by the change detector 194. The change detector detects the change in the magnitude of the potentiometer voltage and provides the signal on line 192 which will then be representative of the change. As the change in tool position is effected, the signal 192 will approach the control signal on line 190. Once the servo amplifier 188 determines that the signals on lines 190 and 192 are the same, the output signal on either line 195 or 196 which was responsible for the change is terminated. The change detector receives the reference voltage on line 36 and is responsive thereto so that after a predetermined time subsequent to a movement of the potentiometer providing an output signal on line 66, the output voltage on line 192 of the change detector is reset to three volts thereby reestablishing the initial conditions for the next tool adjustment.

When a bore 26 is measured which is outside of the upper or lower limits, the signal on line 182 is not provided as previously explained. Once three bores have been measured which are either above or below the limits, as previously explained, a signal is provided on line 152 or line 166, respectively, which is provided to its respective AND gate 206 or 208. When the servo amplifier clockwise output signal from line 195 and the signal on line 152 are coincidentally received at the AND gate 206, the AND gate 206 provides a signal on line 210 to the clockwise driver 200 which results in an output signal on line 50 to cause a clockwise tool adjustment as previously described. When the servo amplifier counter-clockwise output signal on line 196 and a signal on line 166 are coincidentally received at the AND gate 208, the AND gate 208 provides an output signal on line 212 to the counter-clockwise driver 204 which results in an output signal on line 52 to provide a counter-clockwise tool adjustment as previously explained.

The upper and lower limits for the bore 26 of the workpiece W established by the upper and lower limit reference generators 108 and 110, respectively, are chosen so that they are well within the upper and lower tolerances permitted for the workpiece W. If desired, upper tolerance comparators and lower tolerance comparators with associated upper tolerance reference generators and lower tolerance reference generators similar to those shown as units 104, 106, 108 and 110, respectively, can be provided which receive the output signal on line 46 for determining when the bore 26 of a workpiece W is outside of the tolerance limits. The control unit may be adapted to shut down the boring machine 12 when an out-of-tolerance part is detected.

The preferred form of the tool adjusting mechanism 16 can best be seen with reference to FIGs. 4–6 in which the tool adjusting mechanism 16 is shown in greater detail. The tool adjusting mechanism 16 includes a central rotatable shaft 214 having shaft portions 216, 218, 220 and 222 of differing diameters and which may be a composite structure of several assembled coaxial pieces. The last mentioned portion 222 is preferably one of such composite portions and includes a collet chuck fingers 224 which extend slightly radially outwardly and have axially extending slots permitting radially-inward compression of the fingers 224. A collet chuck collar 226 is coaxially disposed with respect to the shaft portion 226 and is axially slidable relative thereto so as to cause compression of the fingers 224 by downward movement of the collar 226 relative to the chuck portion 222. The collar 226 includes a radially outwardly extending flange 228 which is sealingly engaged with a radially outwardly cylindrical wall 230 and a radially inwardly cylindrical wall 232 by seals 234 and 236. The flange 228 divides a chamber defined by the walls 230 and 232 into opposed chamber portions which are communicated with high pressure air at certain times by ports 238 and 240. It will be appreciated that when the pressure at port 240 is relieved and the pressure at port 238 is increased, the flange 228 and the attached sleeve 226 will be forced downwardly to bias the fingers 224 on the chuck member 222 radially inwardly. When the pressure in port 238 is relieved and the pressure in port 240 is increased, the sleeve 226 will be forced upwardly relative to the chuck portion 222 to allow radially-outward expansion of the collet fingers 224.

The entire shaft 214 and sleeve assembly 226 are rotatably supported by bearings 242 and 244. As best seen in FIG. 5, the shaft 214 is driven by a reduction driver 58 which includes worm gear 246 mounted on the shaft 214 and worm 248 mounted on a transverse shaft 250. The shaft 250 is rotatably driven by the geared servo motor 54 through a suitable coupling therebetween. The feedback potentiometer 62 is rotatably driven by the shaft 250 through a suitable coupling to indicate the actual rotation of the shaft 214.

As can be best seen in FIGS. 4 and 6, the shaft portion 216 carries a cam 78 for rotation therewith which is operatively associated with the limit switches 72 and 74 as previously described. The limit switches 72 and 74 have plungers 252 and 254 which are depressed by engagement of the cam 78 with cam following plates 256 and 258, respectively. The limit switches are positioned so that approximately 32.4° of rotation from center position of the cam 78 causes opening of the engaged limit switch 72 or 74. The limit switches 72 and 74, along with the operatively associated cam 78, provides a failsafe function to assure that the tool adjustment limits will not be exceeded and workpieces will not be spoiled thereby. It will be appreciated that this function may also be accomplished by monitoring the rotation of the potentiometer 62 at the display 68.

As will now be apparent, the fingers 24 of the chuck section 222 are adapted to engage and grip a cylindrical surface 258 on a tool adjusting mechanism 260 for the boring bar 22 and the cutter 24. In this regard, the cutter 24 is adapted for radial extension and contraction with clockwise and counter-clockwise rotation of the cylindrical surface 258, respectively, by a suitable threaded engagement between a shaft carrying a holder 262 for the tool and a threaded element carried by the boring bar 22 as may be found in the tool adjusting art. To provide for gripping engagement of the cylindrical surface 258 by the fingers of the chuck section 22 at the appropriate time, an air pressure control (not shown) is provided which is operatively associated with the ports 238 and 240 and which is synchronized with the commands to the gear motor 54 on lines 50 and 52. For example, gripping engagement of the cylindrical surface 258 will occur at the appropriate time by providing air pressure to the port 238 upon the generation of a time-to-adjust signal on line 118 and by providing air pressure to the port 240 upon termination of the time-to-adjust signal on line 118.

In view of the preceding description, it will be appreciated that the present invention provides an improved tool wear compensating control in which the total adjustment for tool wear is accomplished proportionally in one step, rather than incrementally, and in which tool adjustments can be made in either of two directions so that temperature variations can also be accommodated. As a special feature of the present invention, counting circuits are provided which are responsive to unusual variations in the measured dimension so as to further accommodate variations in material hardness.

While it will be apparent that the teachings herein are well calculated to teach one skilled in the art the method of making preferred embodiments of this invention, it will be appreciated that the invention is susceptible to modification, variation and change without departing from the proper scope of meaning of the subjoined claims.

What is claimed is:

1. For a machine having a tool for machining a surface of a workpiece to a predetermined nominal dimension and a gaging unit for providing an output signal representative of the predetermined dimension after machining, a tool adjustment system comprising:

means responsive to said gaging unit output signal for providing an error signal representative of the magnitude of the deviation between said predetermined dimension after machining and said predetermined nominal dimension;

detecting means responsive to said error signal for detecting first deviations having magnitudes which are less than a first predetermined magnitude of deviation, for detecting second deviations having magnitudes which are greater than said first predetermined magnitude of deviation but less than a second predetermined magnitude of deviation and for providing an output signal representative of said first detected deviations upon each said first detected deviations and an output signal representative of said second detected deviations only after a predetermined number of successive ones of said second detected deviations; and tool adjusting means being adapted to cooperate with said tool for adjusting said tool, said tool adjusting means being responsive to said error signal and said detecting means output signal for adjusting said tool in accordance with said error signal only after said detecting means output signal indicates that either one of said first detected deviations has occurred or said predetermined number of successive ones of said second detected deviations have occurred so that said tool adjustment is not made after the occurrence of a lesser number of said successive ones of said second detected deviations.

2. A system according to claim 1 wherein said predetermined number is three.

3. A system according to claim 1 wherein said detecting means detects deviations in which said predetermined dimension after machining is greater than said predetermined nominal dimension and deviations in which said predetermined dimension after machining is less than said predetermined nominal dimension.

4. A system according to claim 1 wherein said detecting means includes means for generating first and second reference signals representative of said first and second predetermined magnitudes of deviations and comparator means for comparing said reference signal with said error signal for providing said detecting means output signal.

5. A system according to claim 1 wherein said second predetermined magnitude of deviation is selected to be within permitted tolerances for said workpiece surface.

6. A system according to claim 1 wherein said predetermined magnitudes of said second deviations is selected to be generally representative of deviations due to variations in the hardness of said workpieces as opposed to deviations due to normal wear of said tool.

* * * * *